United States Patent
Iwazaki et al.

(10) Patent No.: US 6,761,662 B2
(45) Date of Patent: Jul. 13, 2004

(54) ELECTROMAGNETIC COUPLING APPARATUS

(75) Inventors: Akihiro Iwazaki, Wako (JP); Shin Aoki, Wako (JP); Rikiya Kunii, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/358,138

(22) Filed: Feb. 5, 2003

(65) Prior Publication Data

US 2003/0186773 A1 Oct. 2, 2003

(30) Foreign Application Priority Data

Mar. 28, 2002 (JP) ..................................... P2002-091597

(51) Int. Cl.⁷ ........................ F16D 27/115; F16H 48/22
(52) U.S. Cl. ................. 475/221; 192/84.91; 192/84.96; 188/161
(58) Field of Search ............................. 192/84.9, 84.91, 192/84.93, 84.96, 48.2; 335/279, 281; 475/221, 150, 154; 188/71.5, 161

(56) References Cited

U.S. PATENT DOCUMENTS

| | | | | |
|---|---|---|---|---|
| 3,419,118 A | * | 12/1968 | Allaben, Jr. .............. | 192/84.91 |
| 4,622,209 A | * | 11/1986 | Nardi et al. ................ | 422/112 |
| 5,052,534 A | * | 10/1991 | Gustin et al. ............. | 192/84.96 |
| 5,352,101 A | * | 10/1994 | Morinigo et al. .......... | 417/410.1 |
| 6,025,664 A | * | 2/2000 | Kuwahara .................. | 192/84.3 |
| 6,378,677 B1 | * | 4/2002 | Kuroda et al. ............. | 192/84.91 |
| 6,672,443 B2 | * | 1/2004 | Iwazaki et al. ............. | 192/84.2 |
| 2003/0181278 A1 | * | 9/2003 | Gradu ......................... | 475/154 |

FOREIGN PATENT DOCUMENTS

| | | |
|---|---|---|
| DE | 1 027 943 | 4/1958 |
| DE | 1 935 562 | 1/1970 |
| DE | 100 29 778 | 1/2002 |
| JP | 11-260632 | 9/1999 |

* cited by examiner

*Primary Examiner*—Charles A. Marmor
*Assistant Examiner*—Dennis Abdelnour
(74) *Attorney, Agent, or Firm*—Westerman, Hattori, Daniels & Adrian, LLP

(57) ABSTRACT

An electromagnetic coupling apparatus interposed between a fixed housing and a rotating member. The electromagnetic coupling apparatus includes a multiplate brake mechanism, a ringlike core member fixed in the housing, an annular exciting coil accommodated in an annular groove of the core member, and a ringlike armature member opposed to the annular groove of the core member. The armature member has an outer diameter larger than the outer diameter of the core member. The electromagnetic brake further includes a cylindrical pressure member having one end fixed to an outer circumferential portion of the armature member and the other end engaged with the multiplate brake mechanism. The cylindrical pressure member surrounds the core member so as to be movable in a direction of applying a pressure to the multiplate brake mechanism as being guided by the core member. The opposed portion between the core member and the armature member is formed by tapered end surfaces each having a predetermined tapered angle.

5 Claims, 15 Drawing Sheets

ELECTROMAGNETIC COUPLING APPARATUS

BACKGROUND OF THE INVENTION

1. Field of the Invention

The present invention relates to an electromagnetic coupling apparatus such as brake or clutch and a drive force distributing apparatus for a vehicle using the electromagnetic coupling apparatus.

2. Description of the Related Art

A differential is located in a power train of a vehicle to maintain torque distribution between right and left wheels of the vehicle such that torque is equally divided between the right and left wheels and to rotate the outside wheel faster than the inside wheel in cornering, thereby reliably obtaining smooth cornering. While the primary role of the differential is to obtain smooth cornering as mentioned above, there is a case that one of the right and left wheels may be caught to slip in a muddy place during rough-road running. In this case, the resistance from the road to the wheel caught to slip in the muddy place is small, so that torque is almost transmitted to this slipping wheel and hardly transmitted to the other wheel. As a result, the drive force for driving the wheels becomes lacking to cause a problem that the slipping wheel cannot escape from the muddy place. This problem is a defect inherent to a general differential.

Known is a special type of differential having a differential motion limiting mechanism capable of compensating for the above inherent defect of a general differential. This type of differential is referred to as a limited slip differential (LSD). A planetary gear type differential is generally known in the art. For example, such a planetary gear type differential gear assembly having a limited slip differential mechanism composed of an electromagnetic clutch and a multiplate clutch is disclosed in Japanese Patent Laid-open No. Hei 6-33997. In this differential gear assembly, an attraction force between a solenoid and an armature forming the electromagnetic clutch is applied to the multiplate clutch to press it and selectively control an engaging force generated in the multiplate clutch.

A connecting member consisting of a plurality of bars is located between a pressure plate of the multiplate clutch and the armature. That is, one end of each bar of the connecting member is fixed to the pressure plate of the multiplate clutch, and the other end comes into abutment against an inner circumferential portion of the armature when the solenoid is operated. In the conventional differential gear assembly mentioned above, the plural bars fixed to the pressure plate extend in a direction substantially perpendicular to the pressure plate. Accordingly, in the case that any of these bars are inclined to the pressure plate, there is a problem that a pressing force of the armature attracted by the solenoid to press the pressure plate of the multiplate clutch may not be uniformly transmitted to the pressure plate.

Further, in the conventional differential gear assembly described in the above publication, the electromagnetic clutch controls the engaging force of the multiplate clutch, so that the plural bars as pressure members are located so as to correspond to the inner circumferential portion of the armature. However, in a multiplate brake structure having a plurality of brake plates and a plurality of brake discs, these brake plates and brake discs are generally located so as to correspond to an outer circumferential portion of the armature from the viewpoint of the structure. Accordingly, it is difficult that the conventional structure described in the above publication such that the multiplate clutch is operatively connected to the armature at its inner circumferential portion is applied to the multiplate brake structure without any changes.

In the differential gear assembly described in the above publication, the opposed portion between the armature and a core having a solenoid coil is formed by flat opposed surfaces. This structure has a problem that high accuracy is required for control of an air gap between the core and the armature, because the relation between current and attraction force is sensitive to a change in this air gap.

Japanese Patent Laid-open No. Hei 11-260632 discloses a technique such that the opposed surfaces of a linear solenoid core and an armature are inclined with respect to their radial directions to increase the opposed area between the core and the armature, thereby improving the responsivity. Japanese Utility Model Laid-open No. Hei 6-26213 discloses an electromagnet configured so that one of the opposed surfaces of a core and an armature is formed with a V-groove and the other is formed with a wedge to be fitted with the V-groove. In each of these techniques described in the above publications, the opposed surfaces of the core and the armature are inclined with respect to their radial directions, so as to increase the opposed area between the core and the armature, thereby improving the responsivity. However, no attention has been paid to such an object of the present invention that the relation between current and attraction force is to be insensitive to a change in the air gap.

SUMMARY OF THE INVENTION

It is therefore an object of the present invention to provide an electromagnetic coupling apparatus which can make the relation between current and attraction force insensitive to a change in the air gap between the core and the armature.

In accordance with an aspect of the present invention there is provided an electromagnetic coupling apparatus interposed between a fixed housing and a rotating member at least partially accommodated in the fixed housing. This electromagnetic brake includes a multiplate brake mechanism having a plurality of brake plates mounted on the fixed housing and a plurality of brake discs mounted on the rotating member so as to be arranged in alternate relationship with the brake plates; a ringlike core member fixed in the fixed housing, said core member having an annular groove and a first outer diameter; an annular exciting coil accommodated in the annular groove of the core member; and a ring-like armature member arranged in opposed relationship with the annular groove of the core member, said armature member having a second outer diameter larger than the first outer diameter.

The electromagnetic coupling apparatus further includes a cylindrical pressure member provided so as to surround the outer circumferential surface of the core member and be movable in a direction of pressing the multiplate brake mechanism as being guided by the core member, said pressure member having a first end fixed to an outer circumferential portion of the armature member and a second end engaged with the multiplate brake mechanism. The term "electromagnetic coupling apparatus" may include an electromagnetic brake and an electromagnetic clutch.

The ringlike core member has a first radially outside tapered end surface formed radially outside of the annular groove and inclined at a first angle with respect to the axis of the core member, and a first radially inside tapered end surface formed radially inside of the annular groove and inclined at a second angle with respect to the axis of the core member. The ringlike armature member has a second radially outside tapered end surface complementary to the first radially outside tapered end surface, a second radially inside tapered end surface complementary to the first radially inside tapered end surface, and an intermediate end surface opposed to the annular exciting coil.

If the air gap between the ringlike core member and the ringlike armature member changes in the electromagnetic brake having the multiplate brake mechanism, the attraction force of the ringlike core member changes to result in a change in the pressing force of the cylindrical pressure member to the multiplate brake mechanism. Therefore, high accuracy is required for control of the air gap. This air gap changes according to manufacturing variations or aged deterioration (wearing) of the plural brake plates and the plural brake discs of the multiplate brake mechanism.

For example, in the case that the opposed portion between the ringlike core member and the ringlike armature member is flat so as to extend at right angles to the axis, there is a possibility that when the air gap formed by passing a large current through the annular exciting coil to maximize the attraction force of the core member is gradually decreased by the aged deterioration, the pressing force of the cylindrical pressure member may gradually become stronger than an original pressing force. This is due to the fact that the amount of wear of the brake plates and the brake discs of the multiplate brake mechanism due to the aged deterioration appears in the amount of movement (stroke) of the cylindrical pressure member and that the stroke of the cylindrical pressure member and the air gap are in a one-to-one correspondence because the opposed portion between the core member and the armature member is flat so as to extend at right angles to the axis.

According to the invention described above, the opposed portion between the ringlike core member and the ringlike armature member is formed by the tapered surfaces each having a predetermined tapered angle. Accordingly, even when the stroke of the cylindrical pressure member is changed by the aged deterioration of the multiplate brake mechanism, the air gap decreases by an amount corresponding to the tapered angle, so that the relation between the stroke of the cylindrical pressure member and the air gap becomes a one-to-one or less correspondence. Accordingly, a change in the air gap with a change in the stroke of the cylindrical pressure member due to wearing in the multiplate brake mechanism can be suppressed. As a result, the control of the attraction force of the ringlike core member, or the control of the braking force in the multiplate brake mechanism can be accurately performed without much influence by the aged deterioration.

In accordance with another aspect of the present invention, there is provided an electromagnetic coupling apparatus wherein the second angle is set larger than the first angle. At the outer circumferential portion of the ringlike armature member where the cylindrical pressure member is fixed, the attraction force of the ring-like core member is applied to the armature member. At this time, the air gap between the radially outside tapered end surface of the armature member and the radially outside tapered end surface of the core member can be ensured even when the attraction force becomes maximum, because the cylindrical pressure member is connected to the armature member at its outer circumference. However, there is a possibility that the air gap between the radially inside tapered end surface of the armature member and the radially inside tapered end surface of the core member may become zero because of tilt, deflection, etc. of the armature member, causing the contact of the core member and the armature member at their inner circumferential portions.

According to the another aspect of the present invention, the second angle is set larger than the first angle. With this configuration, the air gap between the radially inside tapered end surfaces of the core member and the armature member can be preliminarily set larger than the air gap between the radially outside tapered end surfaces of the core member and the armature member, thereby improving the margin for contact between the core member and the armature member.

In accordance with a further aspect of the present invention, there is provided an electromagnetic coupling apparatus wherein the second radially outside tapered end surface and the second radially inside tapered end surface of the ringlike armature member form a conical projection. In other words, the second radially outside tapered end surface and the second radially inside tapered end surface of the ringlike armature member are formed so as to reduce the volume of the armature member. Accordingly, the moment of tilt of the armature member can be reduced to improve the margin for contact between the core member and the armature member.

In accordance with a still further aspect of the present invention, there is provided an electromagnetic coupling apparatus interposed between a fixed housing and a rotating member at least partially accommodated in the fixed housing. This electromagnetic coupling apparatus includes a multiplate brake mechanism having a plurality of brake plates mounted on the fixed housing and a plurality of brake discs mounted on the rotating member so as to be arranged in alternate relationship with the brake plates; a first ringlike core member fixed in the fixed housing, said first ringlike core member having an annular groove, a first outer diameter, and a first inclined end surface inclined at a first angle with respect to the axis of the first ringlike core member; and a second ringlike core member fixed to the first ringlike core member, said second ringlike core member having a second inclined end surface inclined at a second angle with respect to the axis of the second ringlike core member.

The electromagnetic coupling apparatus further includes an annular exciting coil accommodated in the annular groove of the first ringlike core member; a ringlike armature member arranged in opposed relationship with the first and second inclined end surfaces of the first and second ringlike core members, said armature member having a second outer diameter larger than the first outer diameter; and a cylindrical pressure member provided so as to surround the outer circumferential surface of the first ringlike core member and be movable in a direction of pressing the multiplate brake mechanism as being guided by the first ringlike core member, said pressure member having a first end fixed to an outer circumferential portion of the armature member and a second end engaged with the multiplate brake mechanism. The ringlike armature member has a radially outside end surface inclined at the first angle with respect to the axis of the armature member and a radially inside end surface inclined at the second angle with respect to the axis of the armature member.

Also according to the still further aspect of the present invention, it is possible to obtain a similar effect such that even when the stroke of the cylindrical pressure member changes due to wearing in the multiplate brake mechanism, a change in the air gap between the core member and the armature member can be suppressed. As a result, the control of the attraction force of the core member, or the control of the braking force in the multiplate brake mechanism can be accurately performed without much influence by the aged deterioration.

In accordance with a still further aspect of the present invention, there is provided a drive force distributing apparatus for a four-wheel drive vehicle having a pair of first drive wheels and a pair of second drive wheels, comprising: a fixed housing; a first axle connected to one of said first drive wheels; a second axle connected to the other first drive wheel; an input shaft rotatably mounted in said fixed housing and connected to a drive source; a first planetary gear assembly having a first ring gear operatively connected to said input shaft, a first planetary carrier fixed to said first axle, a first sun gear rotatably mounted on said first axle, and a first planet gear carried by said first planetary carrier so as to mesh with both said first ring gear and said first sun gear; a second planetary gear assembly having a second ring gear operatively connected to said input shaft, a second planetary carrier fixed to said second axle, a second sun gear rotatably mounted on said second axle, and a second planet gear carried by said second planetary carrier so as to mesh with both said second ring gear and said second sun gear; a first multiplate brake mechanism interposed between said fixed housing and said first sun gear; a first electromagnetic coupling apparatus for controllably operating said first multiplate brake mechanism; a second multiplate brake mechanism interposed between said fixed housing and said second sun gear; and a second electromagnetic coupling apparatus for controllably operating said second multiplate brake mechanism; a drive force from said input shaft being distributed among said first axle, said second axle, and said second drive wheels by operating said first electromagnetic coupling apparatus and said second electromagnetic coupling apparatus; said first electromagnetic coupling apparatus comprising: a first ringlike core member fixed in said fixed housing, said first core member having a first annular groove and a first outer diameter; a first annular exciting coil accommodated in said first annular groove of said first core member; a first ringlike armature member arranged in opposed relationship with said first annular groove of said first core member, said first armature member having a second outer diameter larger than said first outer diameter; and a first cylindrical pressure member provided so as to surround the outer circumferential surface of said first core member and be movable in a direction of pressing said first multiplate brake mechanism as being guided by said first core member, said first pressure member having a first end fixed to an outer circumferential portion of said first armature member and a second end engaged with said first multiplate brake mechanism; said first ringlike core member having a first radially outside tapered end surface formed radially outside of said first annular groove and inclined at a first angle with respect to the axis of said first core member, and a first radially inside tapered end surface formed radially inside of said first annular groove and inclined at a second angle with respect to the axis of said first core member; said first ringlike armature member having a second radially outside tapered end surface complementary to said first radially outside tapered end surface, a second radially inside tapered end surface complementary to said first radially inside tapered end surface, and a first intermediate end surface opposed to said first annular exciting coil; said second electromagnetic coupling apparatus comprising: a second ringlike core member fixed in said fixed housing, said second core member having a second annular groove and a third outer diameter; a second annular exciting coil accommodated in said second annular groove of said second core member; a second ringlike armature member arranged in opposed relationship with said second annular groove of said second core member, said second armature member having a fourth outer diameter larger than said third outer diameter; and a second cylindrical pressure member provided so as to surround the outer circumferential surface of said second core member and be movable in a direction of pressing said second multiplate brake mechanism as being guided by said second core member, said second pressure member having a third end fixed to an outer circumferential portion of said second armature member and a fourth end engaged with said second multiplate brake mechanism; said second ringlike core member having a third radially outside tapered end surface formed radially outside of said second annular groove and inclined at a third angle with respect to the axis of said second core member, and a third radially inside tapered end surface formed radially inside of said second annular groove and inclined at a fourth angle with respect to the axis of said second core member; said second ringlike armature member having a fourth radially outside tapered end surface complementary to said third radially outside tapered end surface, a fourth radially inside tapered end surface complementary to said third radially inside tapered end surface, and a second intermediate end surface opposed to said second annular exciting coil.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
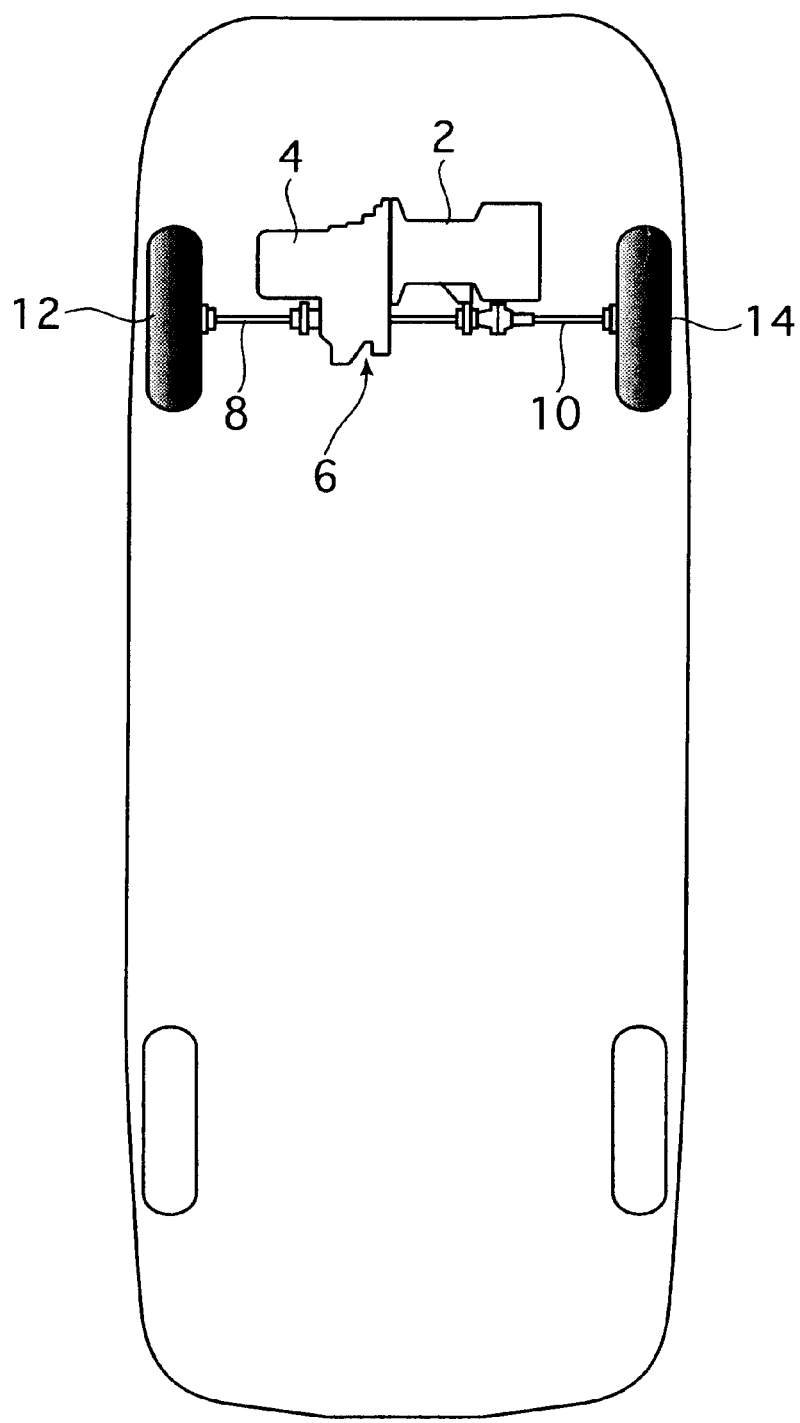
FIG. 1 is a schematic plan view showing the configuration of a front-engine front-drive vehicle on which the drive force distributing apparatus according to the present invention is mounted.

Preferred embodiments of the present invention will now be described in detail with reference to the drawings. FIG. 1 is a schematic plan view showing the configuration of a front-engine front-drive (FF) vehicle to which a drive force distributing apparatus 6 having the electromagnetic brake of the present invention is applied. A drive force from an engine 2 is transmitted through a transmission 4 to the drive force distributing apparatus 6. The drive force transmitted is distributed between a left front axle 8 and a right front axle 10 by the drive force distributing apparatus 6. The drive force thus distributed drives a left front wheel 12 mounted on the left front axle 8 and a right front wheel 14 mounted on the right front axle 10.

Figure 2:
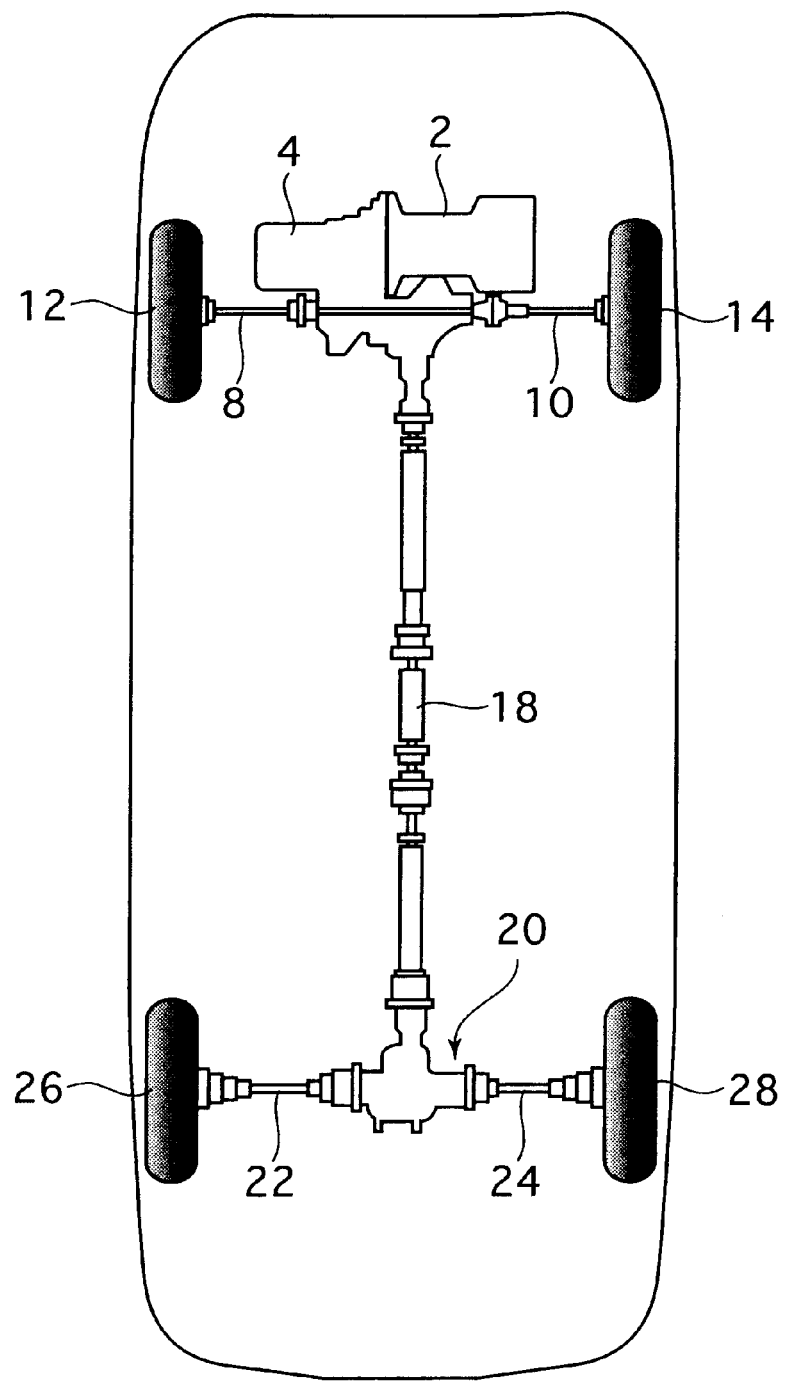
FIG. 2 is a schematic plan view showing the configuration of a four-wheel drive vehicle on which the drive force distributing apparatus according to the present invention is mounted.

FIG. 2 is a schematic plan view showing the configuration of a four-wheel drive vehicle to which a drive force distributing apparatus 20 having the electromagnetic brake of the present invention is applied. A drive force from an engine 2 drives left and right front wheels 12 and 14 through a transmission 4 and left and right front axles 8 and 10. The drive force is also transmitted through a propeller shaft 18 to the drive force distributing apparatus 20. The drive force distributing apparatus 20 has substantially the same configuration as that of the drive force distributing apparatus 6 shown in FIG. 1. The drive force transmitted to the drive force distributing apparatus 20 is distributed between a left rear axle 22 and a right rear axle 24 at a given ratio. The drive force thus distributed drives a left rear wheel 26 mounted on the left rear axle 22 and a right rear wheel 28 mounted on the right rear axle 24.

As will be hereinafter described in detail, the drive force distributing apparatus 20 incorporates a pair of electromagnetic brakes. By controlling braking forces of the electromagnetic brakes, the drive force from the propeller shaft 18 can be arbitrarily distributed between the rear wheels 26 and 28. Further, in the case of idling the rear wheels 26 and 28, the drive force from the engine 2 can be entirely supplied to the front wheels 12 and 14. In this case, this four-wheel drive vehicle operates as an FF vehicle.

Figure 3:
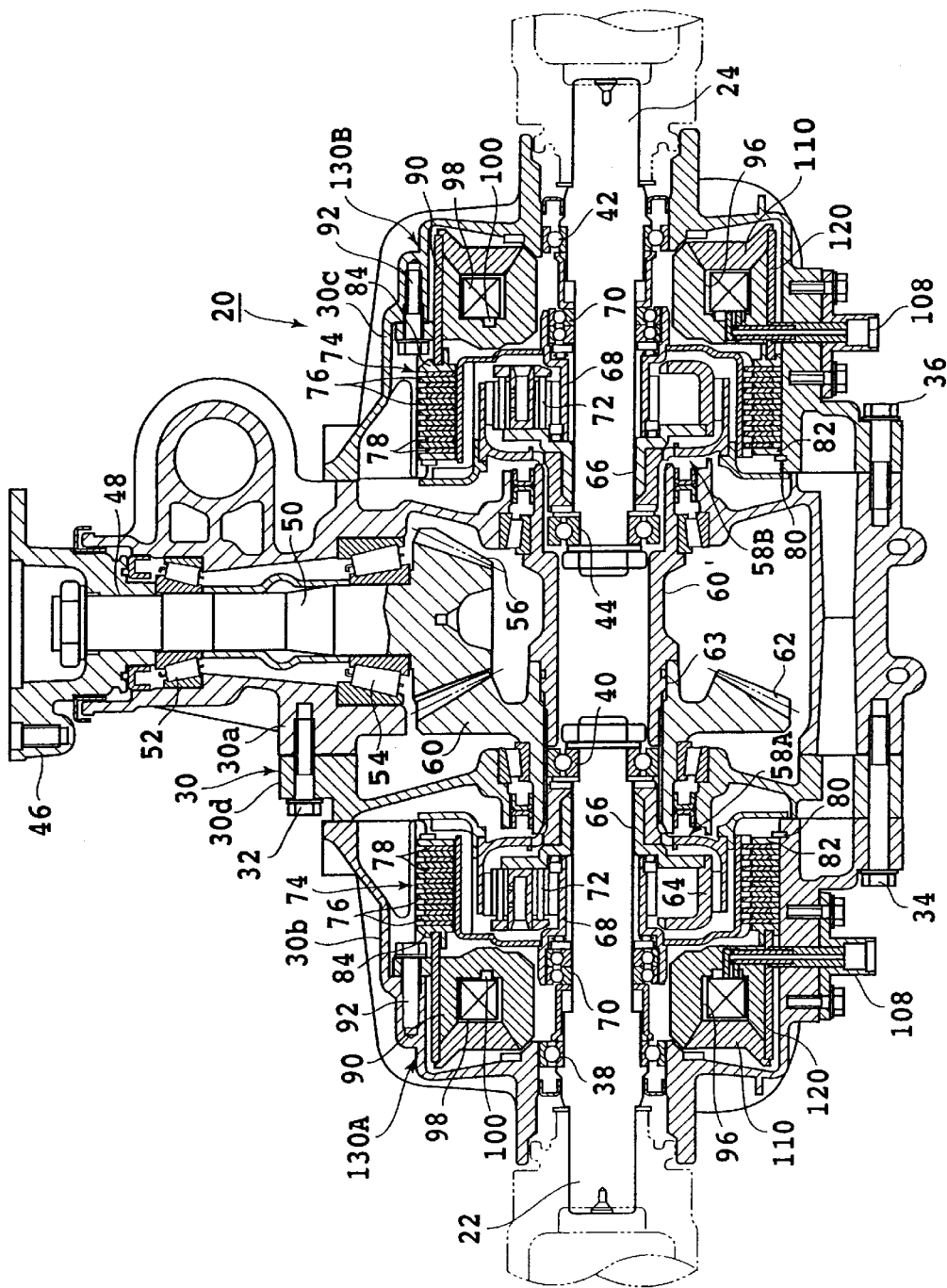
FIG. 3 is a sectional view of the drive force distributing apparatus shown in FIG. 2.
Figure 4:
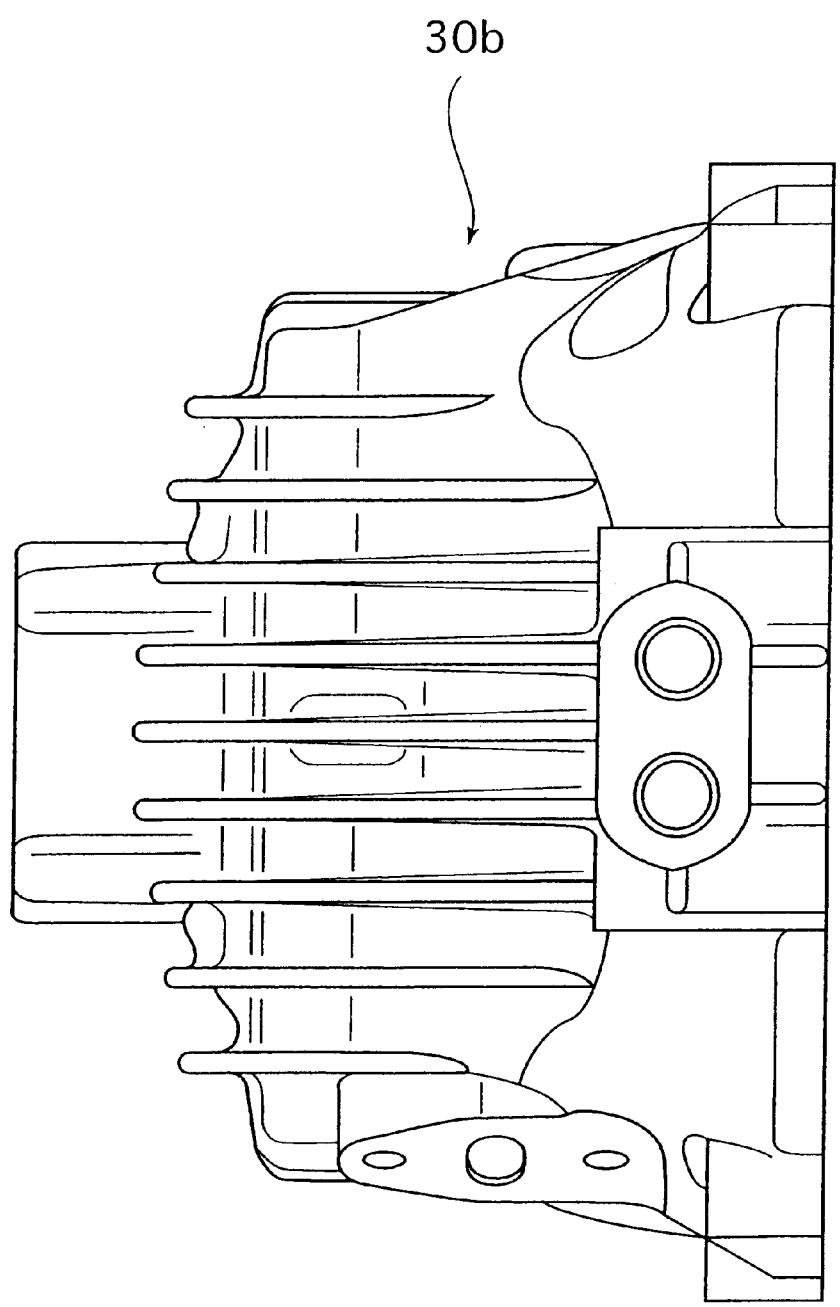
FIG. 4 is an elevational view of a left side housing.
Figure 5:
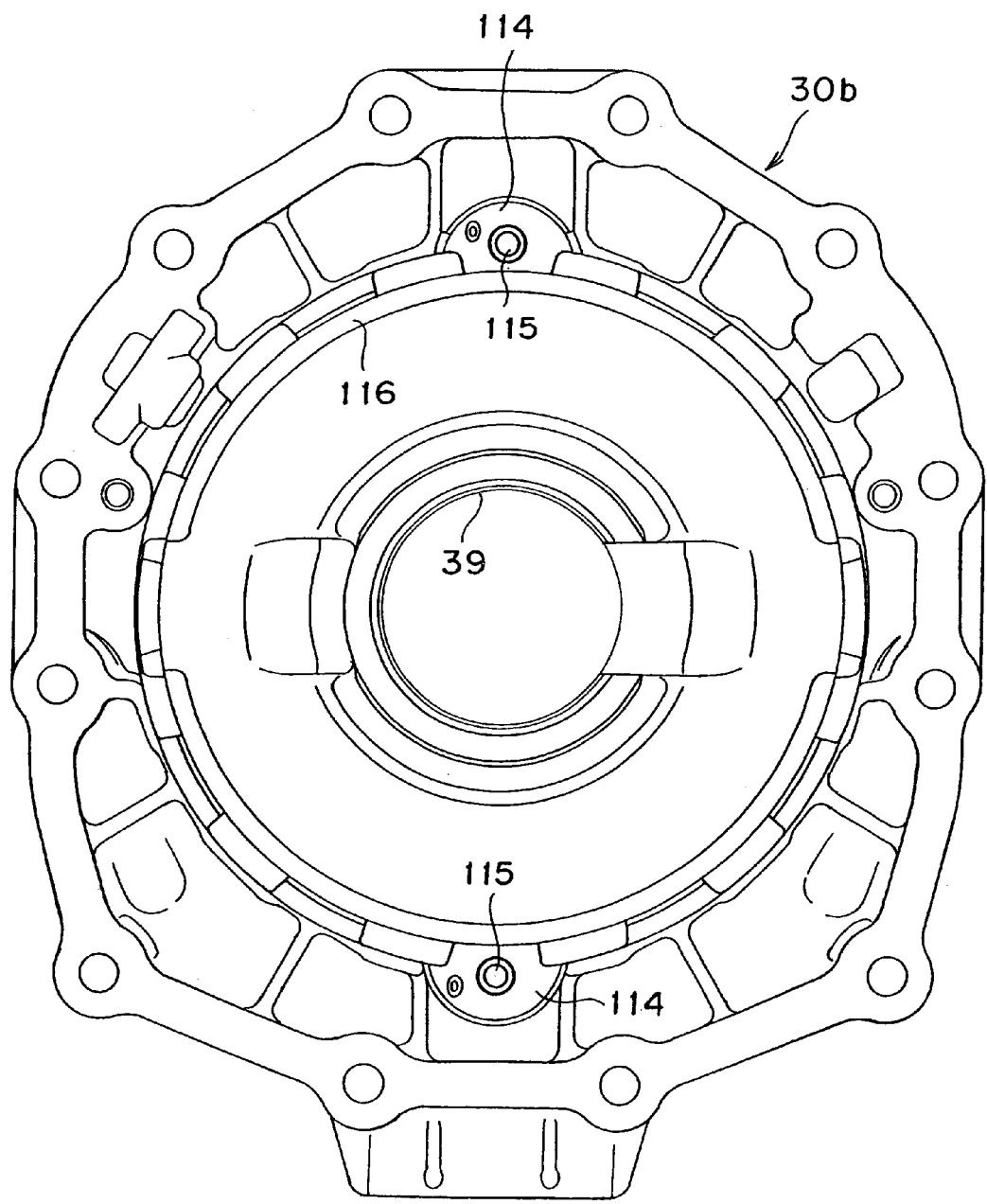
FIG. 5 is a right side view of the left side housing shown in FIG. 4.

Referring to FIG. 3, there is shown a sectional view of the drive force distributing apparatus 20. Reference numeral 30 denotes a fixed housing. The fixed housing 30 is composed of a central housing 30a, a left side housing 30b, a right side housing 30c, and an intermediate housing 30d. The left side housing 30b and the intermediate housing 30d are fastened to the central housing 30a by screws 32 and 34. The right side housing 30c is fastened to the central housing 30a by screws 36. FIG. 4 is an elevational view of the left side housing 30b, and FIG. 5 is a right side view of FIG. 4. The left rear axle 22 is rotatably supported in the housing 30 by a pair of bearings 38 and 40. Similarly, the right rear axle 24 is rotatably supported in the housing 30 by a pair of bearings 42 and 44. The left rear axle 22 is connected to the left rear wheel 26, and the right rear axle 24 is connected to the right rear wheel 28.

Reference numeral 46 denotes a companion flange, which is fastened to the propeller shaft 18 shown in FIG. 2 by screws (not shown). An input shaft 50 is rotatably supported in the housing 30 by a pair of needle bearings 52 and 54. The input shaft 50 is connected at its front end to the companion flange 46 by splines 48. The input shaft 50 is formed at its rear end with a bevel gear 56. A planetary gear assembly 58A is interposed between the input shaft 50 and the left rear axle 22, and a planetary gear assembly 58B is interposed between the input shaft 50 and the right rear axle 24. The planetary gear assembly 58A has substantially same structure as that of the planetary gear assembly 58B, so like parts are denoted by the same reference numerals and only the planetary gear assembly 58A will now be primarily described.

Reference numeral 60 denotes an input ring gear of the planetary gear assembly 58A. The input ring gear 60 is formed at its right end with a bevel gear 62. The bevel gear 62 of the input ring gear 60 meshes with the bevel gear 56 of the input shaft 50. The planetary gear assembly 58B has a ring gear 60' connected to the ring gear 60 of the planetary gear assembly 58A by splines 63. Accordingly, the ring gear 60' of the planetary gear assembly 58B is rotationally driven by the input shaft 50 through the ring gear 60 of the planetary gear assembly 58A. The planetary gear assembly 58A further includes a planetary carrier 64, a sun gear 68, and a plurality of planet gears 72 (one of which being shown). The planetary carrier 64 is fixed to the left rear axle 22 by splines 66. The sun gear 68 is rotatably mounted on the left rear axle 22 by a bearing 70. Each planet gear 72 is carried by the planetary carrier 64 and meshes with both the sun gear 68 and the ring gear 60.

Reference numeral 74 denotes a wet type multiplate brake mechanism. The wet type multiplate brake mechanism 74 includes a plurality of brake plates 76 mounted on the housing 30 and a plurality of brake discs 78 mounted on the sun gear 68. The brake plates 76 and the brake discs 78 are alternately arranged. Each brake plate 76 is mounted on the housing 30 so as to be axially movable and unrotatable, and each brake disc 78 is mounted on the sun gear 68 so as to be axially movable and unrotatable. A snap ring 80 is mounted on the housing 30 to axially position one end (the right end) of the multiplate brake mechanism 74. Fine adjustment of this positioning is made by controlling the thickness of a shim 82 located axially adjacent to the snap ring 80.

Figure 6A:
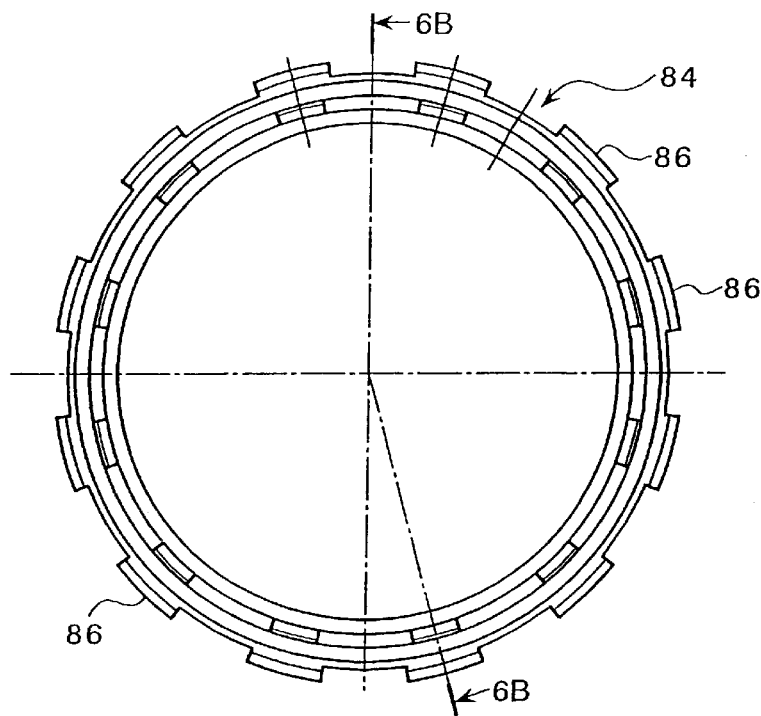
FIG. 6A is an elevational view of an annular pressure plate.
Figure 6B:
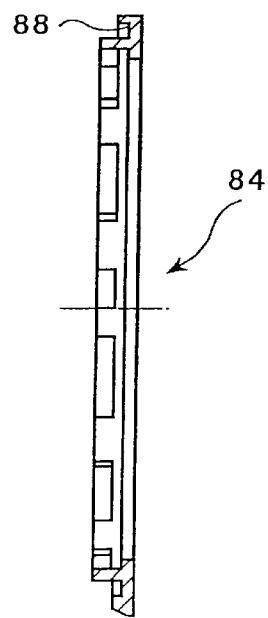
FIG. 6B is a cross section taken along the line 6B—6B in FIG. 6A.

An annular pressure plate 84 is provided at the other end (the left end) of the multiplate brake mechanism 74. As shown in FIG. 6A, the annular pressure plate 84 has a plurality of projections 86 spaced apart from each other in the circumferential direction. These projections 86 are inserted in axial grooves formed on the inner wall of the housing 30, so that the annular pressure plate 84 is mounted on the housing 30 so as to be axially movable and unrotatable. As best shown in FIG. 6B, the annular pressure plate 84 is formed at its outer circumferential portion with an annular groove 88 for insertion of a cylindrical pressure member to be hereinafter described. The annular pressure plate 84 may be mounted on the sun gear 68.

Figure 7A:
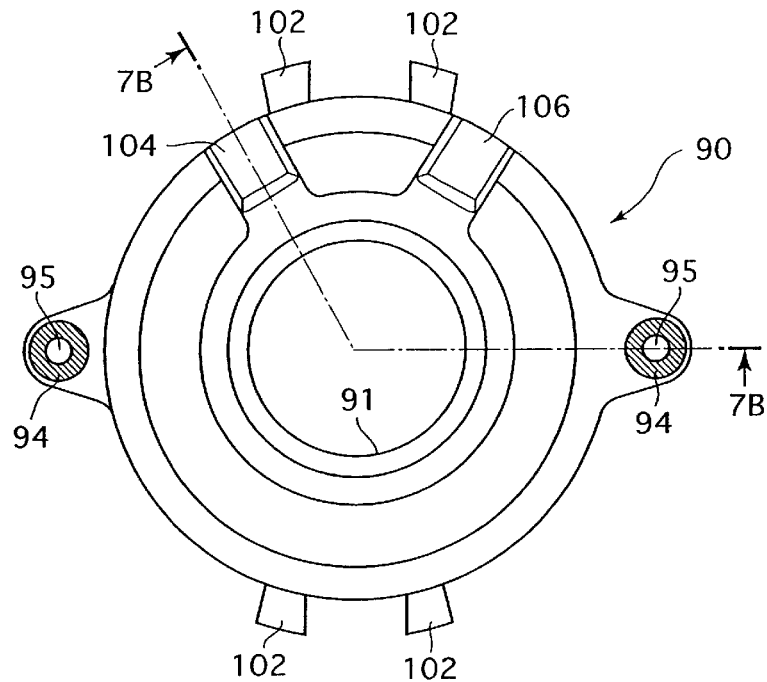
FIG. 7A is an elevational view of a ringlike core member according to a first preferred embodiment of the present invention.
Figure 7B:
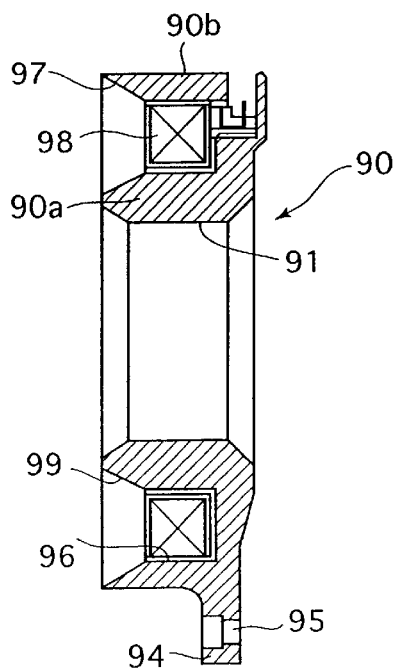
FIG. 7B is a cross section taken along the line 7B—7B in FIG. 7A.

Reference numeral 90 denotes a ringlike core member, which has a first outer diameter and an annular groove 96 having a rectangular cross section. As shown in FIG. 7A, the ringlike core member 90 has a central hole 91 and a pair of fastening portions 94. Each fastening portion 94 is formed with a hole 95 for insertion of a screw 92 (see FIG. 3). As best shown in FIG. 7B, an exciting coil 98 is accommodated in the annular groove 96. The core member 90 is divided into an inner circumferential portion 90a and an outer circumferential portion 90b by the annular groove 96. The sectional area of the inner circumferential portion 90a is substantially equal to that of the outer circumferential portion 90b at their regions corresponding to the exciting coil 98.

The ringlike core member 90 has a radially outside tapered end surface 97 formed radially outside of the annular groove 96 and a radially inside tapered end surface 99 formed radially inside of the annular groove 96. The tapered end surface 97 is inclined at a first angle with respect to the axis of the ringlike core member 90, and the tapered end surface 99 is inclined at a second angle with respect to the axis of the ringlike core member 90. In this preferred embodiment, the tapered angle (first angle) of the tapered end surface 97 is substantially equal to the tapered angle (second angle) of the tapered end surface 99. As shown in FIG. 7A, the core member 90 has four projections 102, a recess 104 for insertion of an exciting coil terminal 108 (see FIG. 3), and a recess 106 for insertion of a search coil terminal (not shown).

As shown in FIG. 3, a search coil 100 is mounted in the annular groove 96 adjacent to the exciting coil 98. The search coil 100 is provided to detect the intensity of magnetic flux in passing a current through the exciting coil 98 and control a coil current supplied to the exciting coil 98 according to the detected intensity of magnetic flux. As shown in FIG. 5, the left side housing 30b has a central hole 39 and a pair of mounting portions 114. Each mounting portion 114 is formed with a tapped hole 115. The left side housing 30b further has an annular abutting portion 116. The core member 90 is fixed to the left side housing 30b by making the projections 102 of the core member 90 abut against the annular abutting portion 116 of the left side housing 30b, making the fastening portions 94 of the core member 90 abut against the mounting portions 114 of the left side housing 30b, and inserting the screws 92 through the holes 95 of the fastening portions 94 to threadedly engage the screws 92 into the tapped holes 115 of the mounting portions 114.

Figure 8:
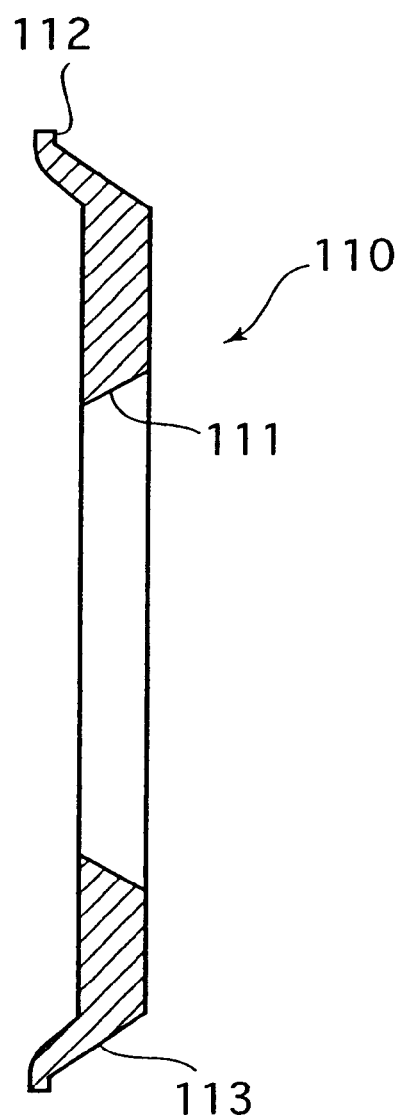
FIG. 8 is a sectional view of a ringlike armature member according to the first preferred embodiment.

A ringlike armature member 110 formed of a magnetic material is located so as to be opposed to the annular groove 96 of the core member 90. As shown in FIG. 8, the armature member 110 has a second outer diameter larger than the first outer diameter of the core member 90, a central hole 111, and an annular mounting groove 112 formed at an outer circumferential portion. The central hole 111 of the armature member 110 has a conical shape complementary to the tapered end surface 99 of the ringlike core member 90. That is, the central hole 111 is tapered at the second angle with respect to the axis of the ringlike armature member 110 to form a radially inside tapered end surface. The armature member 110 has a radially outside tapered end surface 113 having a conical shape complementary to the tapered end surface 97 of the ringlike core member 90. That is, the tapered end surface 113 is inclined at the first angle with respect to the axis of the ringlike armature member 110.

A cylindrical pressure member 120 has a first end (left end) press-fitted with the annular mounting groove 112 of the armature member 110, and a second end (right end) inserted in the annular groove 88 of the annular pressure plate 84. In inserting the second end of the cylindrical pressure member 120 into the annular groove 88 of the annular pressure plate 84, the outer circumference of the cylindrical pressure member 120 is positioned with respect to the annular groove 88. That is, the second end of the cylindrical pressure member 120 is inserted into the annular groove 88 of the annular pressure plate 84 in the condition where the inner circumference of the cylindrical pressure member 120 is loosely fitted with the inner circumference of the annular groove 88 and the outer circumference of the cylindrical pressure member 120 is closely fitted with the outer circumference of the annular groove 88.

Figure 9A:
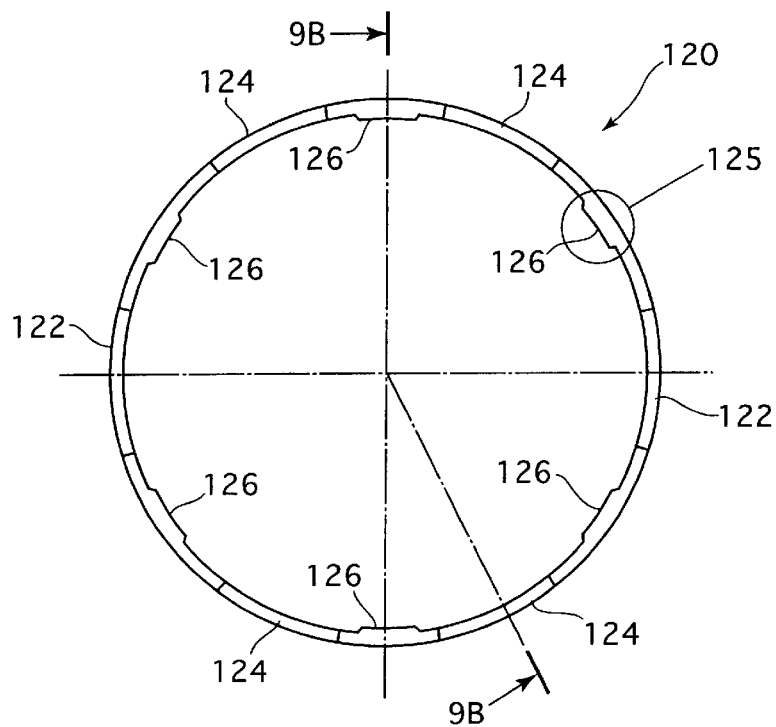
FIG. 9A is an elevational view of a cylindrical pressure member.
Figure 9B:
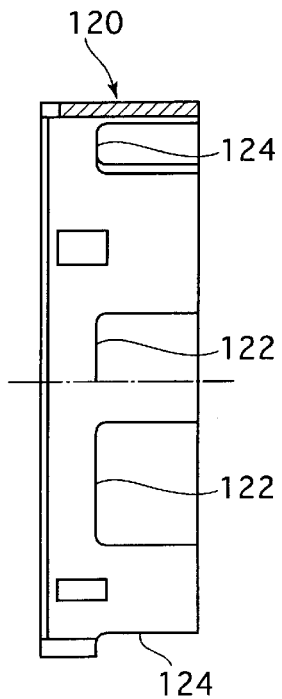
FIG. 9B is a cross section taken along the line 9B—9B in FIG. 9A.
Figure 9C:
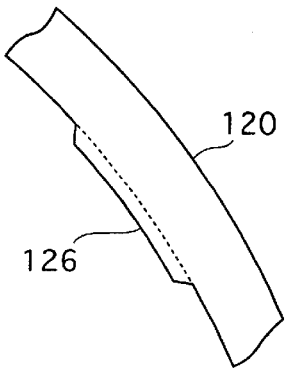
FIG. 9C is an enlarged view of an encircled portion 125 shown in FIG. 9A.

As shown in FIGS. 9A and 9B, the cylindrical pressure member 120 has a pair of cutouts 122 for insertion of the pair of fastening portions 94 of the core member 90 and four cutouts 124 for insertion of the four projections 102 of the core member 90. The inner circumferential surface of the cylindrical pressure member 120 is formed with six projections 126 spaced apart from each other in the circumferential direction. Accordingly, the cylindrical pressure member 120 is movable in its pressing direction (axial direction) in the condition where the projections 126 are in sliding contact with the outer circumferential surface of the core member 90.

An electromagnetic brake 130A including the multiplate brake mechanism 74 is assembled by first press-fitting the first end (left end) of the cylindrical pressure member 120 into the annular mounting groove 112 of the armature member 110, next covering the ringlike core member 90 with the cylindrical pressure member 120 fixed to the armature member 110, next inserting the second end (right end) of the cylindrical pressure member 120 into the annular groove 88 of the annular pressure plate 84, and finally fastening the ringlike core member 90 at the pair of fastening portions 94 to the housing 30.

As mentioned above, the sectional area of the inner circumferential portion 90a of the core member 90 is substantially equal to that of the outer circumferential portion 90b of the core member 90. To this end, the width of the inner circumferential portion 90a is set larger than that of the outer circumferential portion 90b as viewed in the cross section perpendicular to the axial direction. With this configuration, the armature member 110 can be attracted by a uniform force over the radius thereof in passing a current through the exciting coil 98. When a current is passed through the exciting coil 98, a predetermined air gap is defined between the core member 90 and the armature member 110, thereby preventing metallic contact between the core member 90 and the armature member 110.

If the air gap between the core member 90 and the armature member 110 changes, the attraction force of the core member 90 changes to result in a change in the pressing force of the cylindrical pressure member 120 to the multiplate brake mechanism 74. Therefore, high accuracy is required for control of the air gap. This air gap changes according to manufacturing variations or aged deterioration (wearing) of the brake plates 76 and the brake discs 78 of the multiplate brake mechanism 74.

For example, in the case that the opposed portion between the ringlike core member 90 and the ringlike armature member 110 is flat so as to extend at right angles to the axis, there is a possibility that when the air gap formed by passing a large current through the exciting coil 98 to maximize the attraction force of the core member 90 is gradually decreased by the aged deterioration, the pressing force of the cylindrical pressure member 120 may gradually become stronger than an original pressing force. This is due to the fact that the amount of wear of the brake plates 76 and the brake discs 78 of the multiplate brake mechanism 74 due to the aged deterioration appears in the amount of movement (stroke) of the cylindrical pressure member 120 and that the stroke of the cylindrical pressure member 120 and the air gap are in a one-to-one correspondence.

According to this preferred embodiment in contrast thereto, the opposed portion between the ringlike core member 90 and the ringlike armature member 110 is formed by the tapered surfaces each having a predetermined tapered angle. Accordingly, even when the stroke of the cylindrical pressure member 120 is changed by the aged deterioration of the multiplate brake mechanism 74, the air gap decreases by an amount corresponding to the tapered angle, so that the relation between the stroke of the cylindrical pressure member 120 and the air gap becomes a one-to-one or less correspondence. Accordingly, a change in the air gap with a change in the stroke of the cylindrical pressure member 120 can be suppressed. As a result, the control of the attraction force for the armature member 110, or the control of the braking force in the multiplate brake mechanism 74 can be accurately performed without much influence by the aged deterioration.

While the attraction force per unit area in the electromagnetic brake according to this preferred embodiment is smaller by an amount corresponding to the tapered angle than that in the case where the opposed portion between the core member 90 and the armature member 110 is flat, this decreased amount corresponding to the tapered angle can be canceled by the configuration that the opposed area between the core member 90 and the armature member 110 can be increased by forming the tapered angle. The axial positioning of the armature member 110 in the condition where the armature member 110 is attracted to the core member 90 by passing a current through the exciting coil 98 is determined by the mounting portions 114 of the left side housing 30b for fastening the core member 90 to the left side housing 30b and by the position of the snap ring 80 provided at the right end of the multiplate brake mechanism 74 and fixed to the left side housing 30b. The fine adjustment of this axial positioning is made by controlling the thickness of the shim 82 located adjacent to the snap ring 80 to thereby control the accuracy of the gap between the core member 90 and the armature member 110.

While the left planetary gear assembly 58A and the left electromagnetic brake 130A have been described, the right planetary gear assembly 58B and the right electromagnetic brake 130B are substantially the same in structure as the left planetary gear assembly 58A and the left electromagnetic brake 130A, respectively, so the description of the right planetary gear assembly 58B and the right electromagnetic brake 130B will be omitted herein.

According to the electromagnetic brake 130A in this preferred embodiment, the cylindrical pressure member 120 is located around the outer circumferential surface of the ringlike core member 90, so that the right end of the pressure member 120 can press the plural brake plates 76 and the plural brake discs 78 forming the multiplate brake mechanism 74 at their substantially central portions in respect of the effective radius of each element. Accordingly, a uniform pressing force to the multiplate brake mechanism 74 can be obtained with no radial deviation. Further, since the pressing force of the cylindrical pressure member 120 to the multiplate brake mechanism 74 is applied axially straight as being guided by the core member 90, a reduction in control accuracy of braking engagement due to deflection of the cylindrical pressure member 120 can be suppressed.

A brake plate with a facing known in the art can be used without any changes as each brake plate 76 of the multiplate brake mechanism 74, thereby preventing seizure and judder occurring between metallic plates forming the multiplate brake mechanism 76 during the operation of the electromagnetic brake 130A. Since an air gap is defined between the exciting coil 98 and the armature member 110, no residual magnetism is generated in a magnetic path in attracting the armature member 110, thereby improving the stability of control of an attraction force to the armature member 110 and eliminating the need for any parts for canceling an attraction force due to residual magnetism. Furthermore, it is possible to improve the falling response in turning off an electrical signal to the electromagnetic brake 130A and the rising response in turning on an electrical signal to the electromagnetic brake 130A. Furthermore, since the electromagnetic brake 130A is simple in structure, the hysteresis can be reduced.

The operation of this preferred embodiment will now be described. When both the electromagnetic brakes 130A and 130B are in an off state with no currents being passed through the exciting coils 98 of the electromagnetic brakes 130A and 130B, both the multiplate brake mechanism 74 are in a disengaged state, so that the sun gears 68 of the planetary gear assemblies 58A and 58B idly rotate about the left and right rear axles 22 and 24, respectively. Accordingly, the drive force (torque) from the input shaft 50 is not transmitted to the rear axles 22 and 24. In this case, the rear wheels 26 and 28 idly rotate and the drive force is entirely transmitted to the front wheels 12 and 14, so that the four-wheel drive vehicle shown in FIG. 2 operates in a two-wheel drive mode (FF vehicle).

When a predetermined amount of current is passed through the exciting coils 98 of the electromagnetic brakes 130A and 130B to completely engage both the multiplate brake mechanisms 74 through the cylindrical pressure members 120 of the electromagnetic brakes 130A and 130B, the sun gears 68 of the planetary gear assemblies 58A and 58B are fixed in relation to the housing 30. Accordingly, the drive force from the input shaft 50 is equally divided between the rear axles 22 and 24 and transmitted thereto via the input ring gears 60, 60', the planet gear 72 and the planetary carriers 64. As a result, the four-wheel drive vehicle shown in FIG. 2 operates in a four-wheel drive mode to run straight. In the case of a front-engine rear-drive (FR) vehicle, the entirety of the drive force is equally divided between the rear wheels, and this vehicle runs straight. In cornering or escaping from a muddy place, the amperages of the currents passing through the exciting coils 98 of the electromagnetic brakes 130A and 30B are controlled to thereby arbitrarily distribute the drive force from the input shaft 50 between the rear axles 22 and 24, so that optimum cornering control and/or easy escape from the muddy place can be realized.

While the drive force distributing apparatus 20 provided in relation to the rear axles 22 and 24 has been described above with reference to FIGS. 2 to 9C, the drive force distributing apparatus 6 provided in relation to the front axles 8 and 10 as shown in FIG. 1 also has similar operations and effects. Further, while the drive force distributing apparatus 20 is provided in relation to the rear axles 22 and 24 of the four-wheel drive vehicle in this preferred embodiment, the apparatus 20 may be provided in relation to the rear axles of an FR vehicle. Further, while the electromagnetic brake of the present invention is applied to the drive force distributing apparatus 20 in this preferred embodiment, the present invention is not limited to this preferred embodiment, but may be applied to any mechanisms or apparatuss having an electromagnetic brake interposed between a fixed housing and a rotating member.

Figure 10:
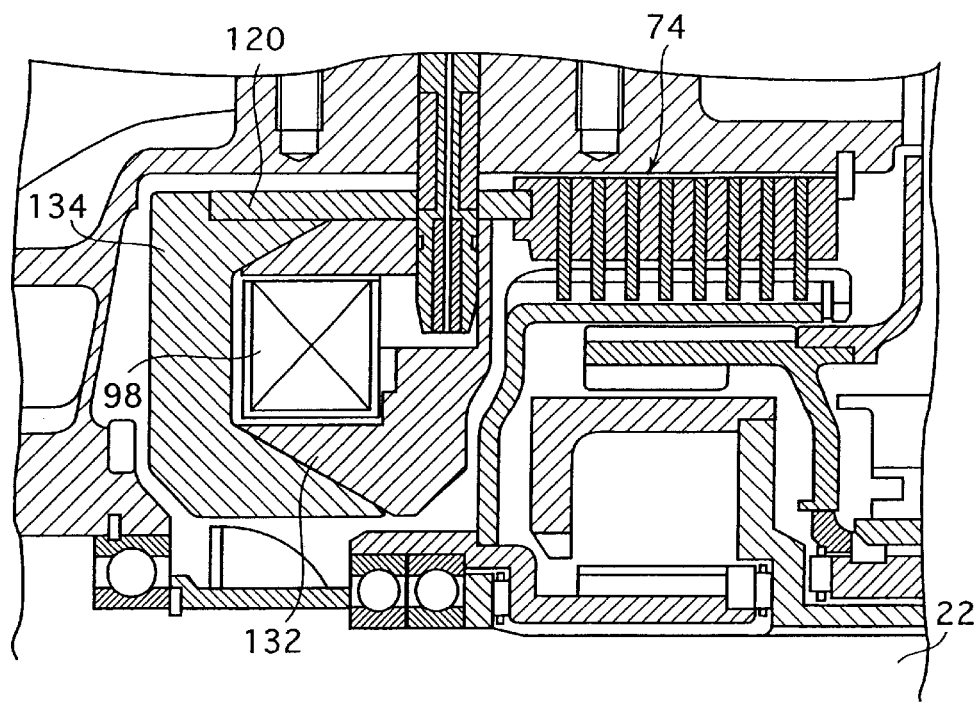
FIG. 10 is a partially cutaway, sectional view of a core member and an armature member according to a second preferred embodiment of the present invention.

Referring to FIG. 10, there is shown a partially cutaway, sectional view of a ringlike core member 132 and a ringlike armature member 134 according to a second preferred embodiment of the present invention. In this preferred embodiment, the core member 132 has tapered end surfaces so as to form a conical projection, and the armature member 134 has tapered end surfaces so as to form a conical recess complementary to the conical projection of the core member 132. This preferred embodiment can also exhibit effects similar to those of the first preferred embodiment shown in FIG. 3.

Figure 11:
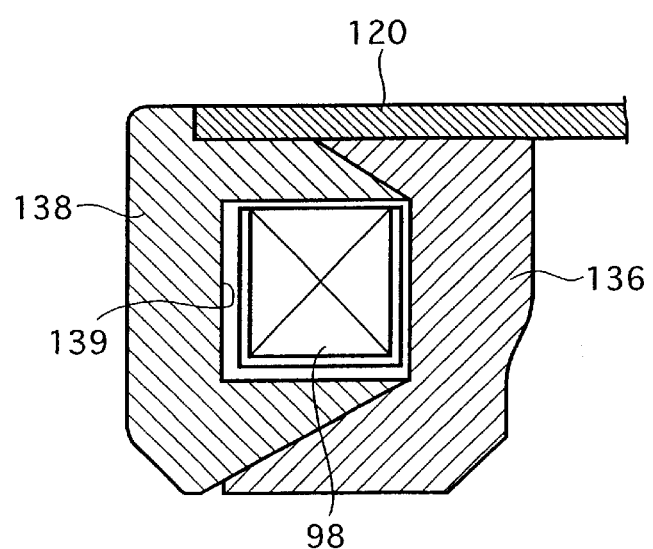
FIG. 11 is a partially cutaway, sectional view of a core member and an armature member according to a third preferred embodiment of the present invention.

Referring to FIG. 11, there is shown a partially cutaway, sectional view of a ringlike core member 136 and a ringlike armature member 138 according to a third preferred embodiment of the present invention. In this preferred embodiment, an annular exciting coil 98 is bonded to the ringlike core member 136, and the ringlike armature member 138 is formed with an annular groove 139 for accommodating the exciting coil 98. Further, the core member 136 has tapered end surfaces so as to form a conical recess, and the armature member 138 has tapered end surfaces so as to form a conical projection complementary to the conical recess of the core member 136. This preferred embodiment can also exhibit effects similar to those of the first preferred embodiment shown in FIG. 3.

Figure 12:
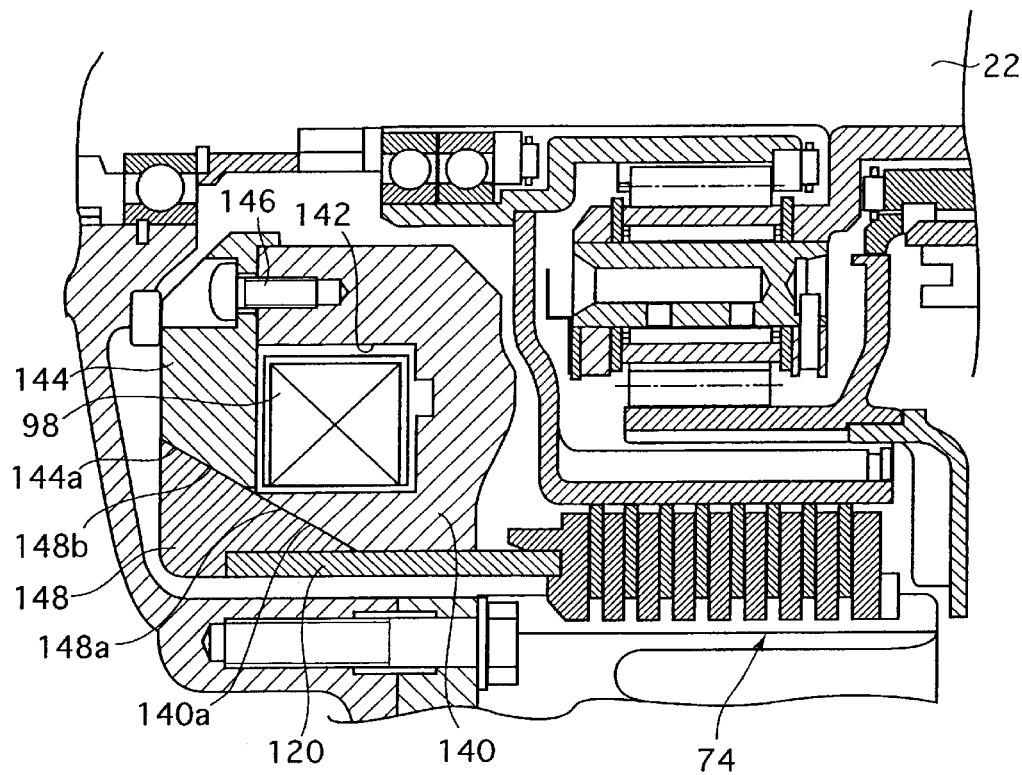
FIG. 12 is a partially cutaway, sectional view of a core member and an armature member according to a fourth preferred embodiment of the present invention.

Referring to FIG. 12, there is shown a partially cutaway, sectional view of first and second ringlike core members 140 and 144 and a ringlike armature member 148 according to a fourth preferred embodiment of the present invention. The first ringlike core member 140 has an annular groove 142 for accommodating an annular exciting coil 98. The first core member 140 has an inclined end surface 140a inclined at a first angle with respect to the axis of the first core member 140. The second ringlike core member 144 is fixed to the first ringlike core member 140 by screws 146 (one of which being shown). The second core member 144 has an inclined end surface 144a inclined at a second angle with respect to the axis of the second core member 144. The ringlike armature member 148 has an outer diameter larger than the outer diameter of the first core member 140, a radially outside inclined end surface 148a inclined at the first angle with respect to the axis of the armature member 148, and a radially inside inclined end surface 148b inclined at the second angle with respect to the axis of the armature member 148.

In this preferred embodiment, the first angle and the second angle are substantially equal to each other, so that the radially outside inclined end surface 148a and the radially inside inclined end surface 148b are flush with each other. The first and second angles may be different from each other. The armature member 148 is mounted on the inclined end surface 140a of the first core member 140 and the inclined end surface 144a of the second core member 144 with a predetermined air gap defined between the inclined end surfaces 140a and 144a and the inclined end surfaces 148a and 148b. This preferred embodiment can also exhibit effects similar to those of the first preferred embodiment shown in FIG. 3.

Figure 13:
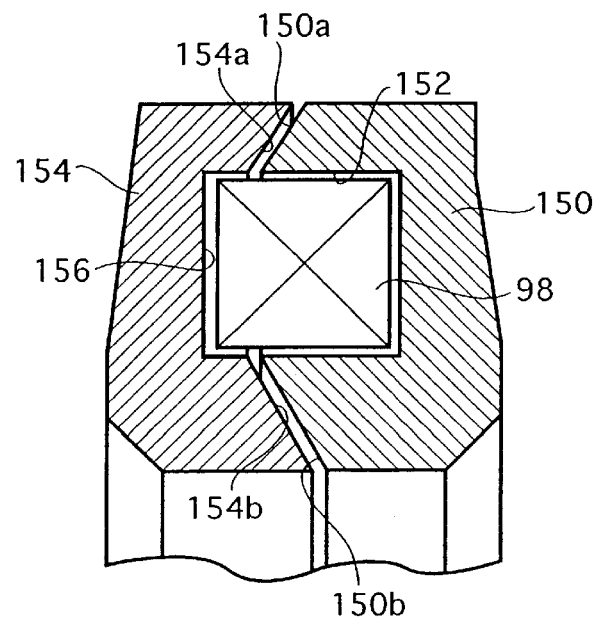
FIG. 13 is a partially cutaway, sectional view of a core member and an armature member according to a fifth preferred embodiment of the present invention.

Referring to FIG. 13, there is shown a partially cutaway, sectional view of a ringlike core member 150 and a ringlike armature member 154 according to a fifth preferred embodiment of the present invention. The core member 150 has an annular groove 152, and the armature member 154 also has an annular groove 156. An annular exciting coil 98 is accommodated in the annular grooves 152 and 156, and the armature member 154 is opposed to the core member 150 with a predetermined gap defined therebetween. The core member 150 has tapered end surfaces 150a and 150b so as to form a conical projection, and the armature member 154 has tapered end surfaces 154a and 154b respectively complementary to the tapered end surfaces 150a and 150b of the core member 150 so as to form a conical recess. This preferred embodiment can also exhibit effects similar to those of the first preferred embodiment shown in FIG. 3.

Figure 14A:
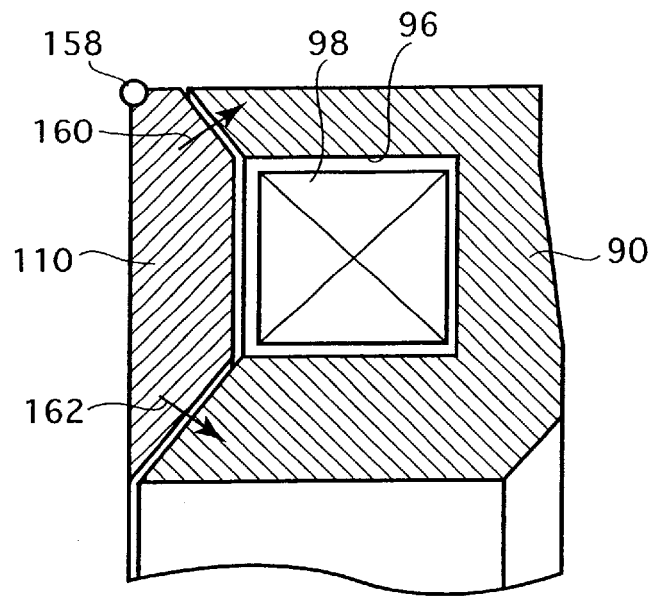
FIG. 14A is a partially cutaway, sectional view of the core member and the armature member according to the first preferred embodiment.

FIG. 14A shows a partially cutaway, sectional view of the ringlike core member 90 and the ringlike armature member 110 according to the first preferred embodiment mentioned above. In the first preferred embodiment, the tapered angle of the radially inside tapered end surface of the core member 90 is substantially equal to the tapered angle of the radially outside tapered end surface of the core member 90 as mentioned above. When the exciting coil 98 is energized, thrusts shown by arrows 160 and 162 are generated at the radially outside and inside tapered end surfaces of the armature member 110. Reference numeral 158 denotes a restricted point. In the case that the tapered angles of the radially outside and inside tapered end surfaces of the core member 90 are substantially equal to each other, there is a possibility that the armature member 110 may come into contact with the core member 90 at their radially inside tapered end surfaces because of deflection of the armature member 110 upon generation of the above thrusts.

The armature member 110 is connected to the cylindrical pressure member 120 at the restricted point 158 located on the outer circumference of the armature member 110. Accordingly, the air gap between the radially outside tapered end surface of the armature member 110 and the radially outside tapered end surface of the core member 90 can be ensured even when the attraction force of the core member 90 becomes maximum. However, there is a possibility that the air gap between the radially inside tapered end surface of the armature member 110 and the radially inside tapered end surface of the core member 90 may become zero because of tilt, deflection, etc. of the armature member 110, causing the contact of the core member 90 and the armature member 110 at their inner circumferential portions.

Figure 14B:
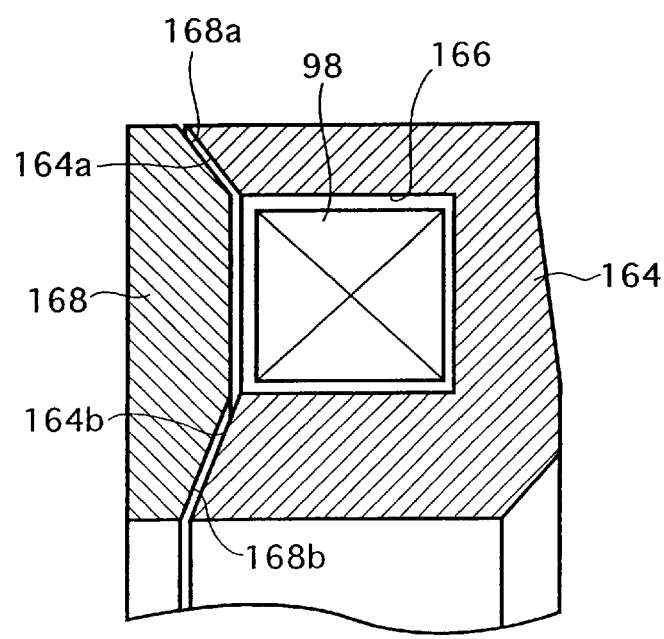
FIG. 14B is a partially cutaway, sectional view of a core member and an armature member according to a sixth preferred embodiment of the present invention.

FIG. 14B shows a partially cutaway, sectional view of a ringlike core member 164 and a ringlike armature member 168 according to a sixth preferred embodiment of the present invention solving this problem. The ringlike core member 164 has a radially outside tapered end surface 164a and a radially inside tapered end surface 164b. The tapered angle of the radially inside tapered end surface 164b with respect to the axis of the core member 164 is larger than the tapered angle of the radially outside tapered end surface 164a with respect to the axis of the core member 164. The ringlike armature member 168 has a radially outside tapered end surface 168a and a radially inside tapered end surface 168b. The radially outside tapered end surface 168a is complementary to the radially outside tapered end surface 164a of the core member 164, and the radially inside tapered end surface 168b is complementary to the radially inside tapered end surface 164b of the core member 164.

By setting the tapered angle of each of the radially inside tapered end surfaces 164b and 168b larger than the tapered angle of each of the radially outside tapered end surfaces 164a and 168a, an actual air gap between the radially inside tapered end surfaces 164b and 168b can be increased. Accordingly, the margin for contact between the core member 164 and the armature member 168 at their inner circumferential portions can be improved.

Figure 15:
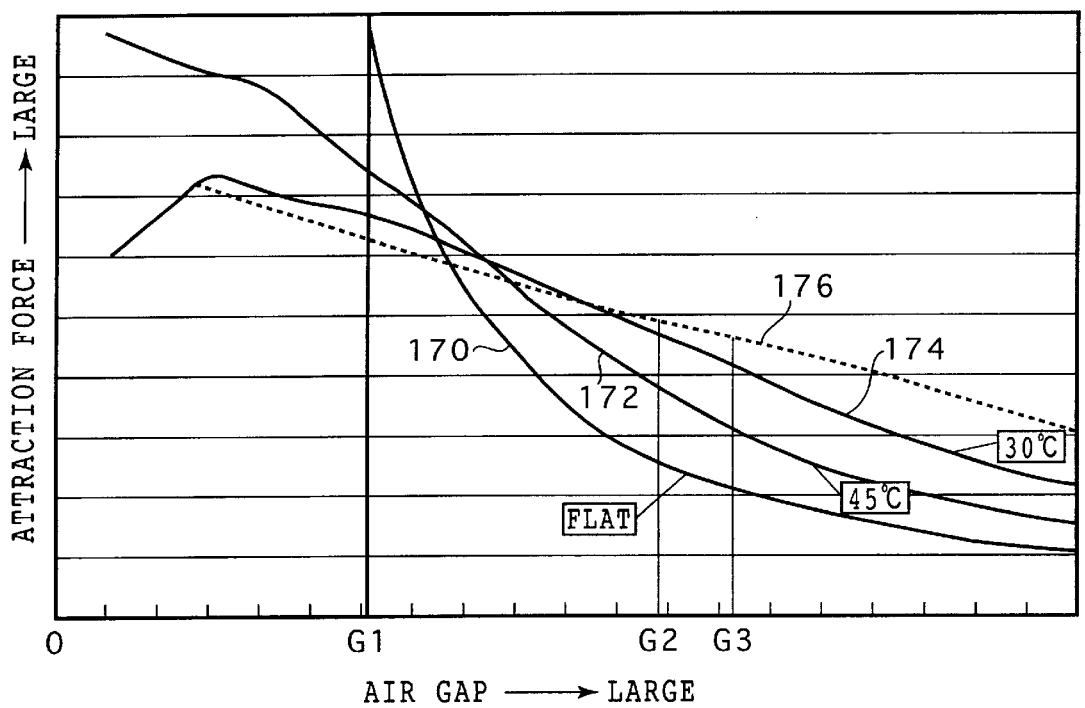
FIG. 15 is a graph showing the relation between the air gap and the attraction force when the shape of the opposed portion between the core member and the armature member is changed.

FIG. 15 is a graph showing the relation between the air gap and the attraction force when the shape of the opposed portion between the core member and the armature member is changed. In this graph, a curve 170 corresponds to the case where the opposed portion is flat, a curve 172 corresponds to the case where the tapered angle of the opposed portion is 45°, and a curve 174 corresponds to the case where the tapered angle of the opposed portion is 30°. In the case that the opposed portion between the core member and the armature member is flat, the attraction force is rapidly increased when the air gap is decreased to G1 or less. In the present invention, the air gap between the core member and the armature member is set in the range between G2 and G3 for use. For example, G2 is 1.2 mm and G3 is 1.3 mm.

A broken line 176 indicates a required characteristic of the air gap and the attraction force. By suitably setting the tapered angle of each of the radially inside and outside tapered end surfaces in consideration of the relation between the air gap and the tapered angle, the relation between the air gap and the attraction force (thrust) can be made to match the required characteristic shown by the broken line 176. While an ideal characteristic of the air gap and the attraction force is shown by a straight line with no slope such that the attraction force is not changed with a change in the air gap, such an ideal characteristic cannot be realized.

Figure 16:
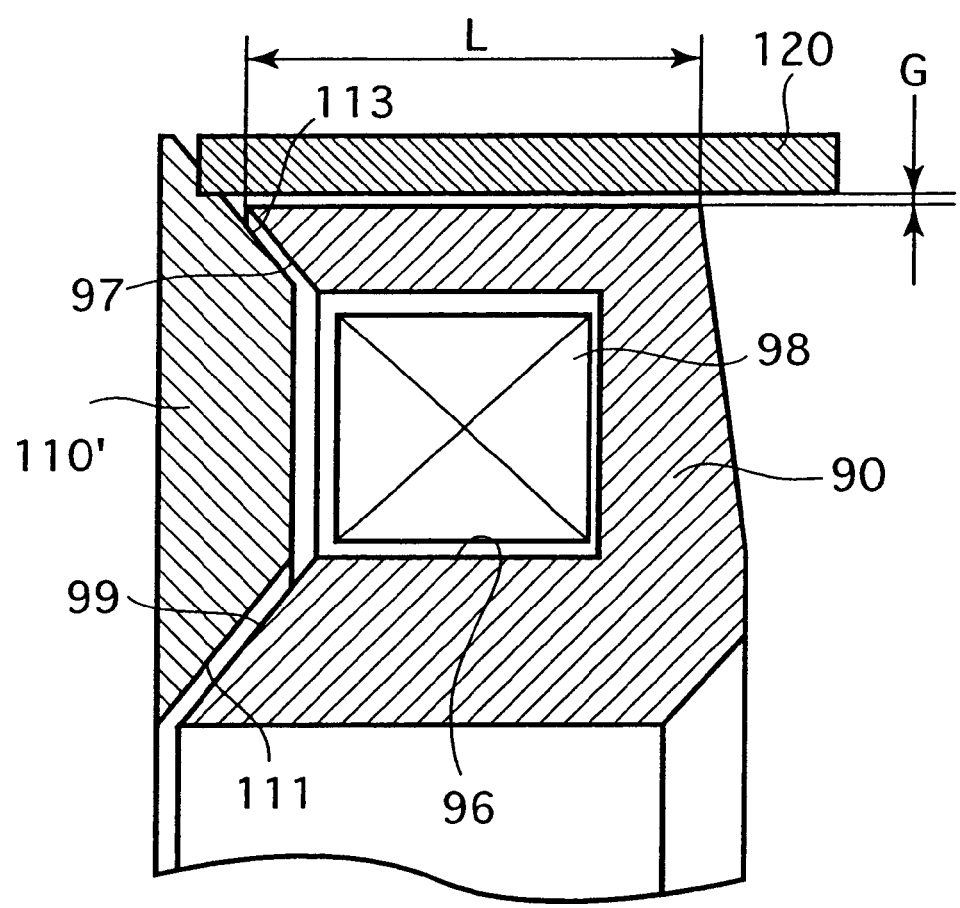
FIG. 16 is a partially cutaway, sectional view showing a modification of the first preferred embodiment.

Referring to FIG. 16, there is shown a partially cutaway, sectional view of a modification of the first preferred embodiment. Both the radially inside tapered end surface 111 and the radially outside tapered end surface 113 of a ringlike armature member 110' are set so as to reduce the volume of the armature member 110'. That is, the armature member 110' has a reduced volume so as to form a conical projection. By setting the tapered end surfaces 111 and 113 of the armature member 110' as mentioned above, the axial length L of the outer circumferential surface of the core member 90 can be increased. Accordingly, the engagement length L between the core member 90 and a cylindrical pressure member 120 press-fitted with the armature member 110' can be increased to thereby prevent the tilt of the armature member 110' and allow the use in the condition where the air gap between the core member 90 and the armature member 110' becomes small.

Figure 17:
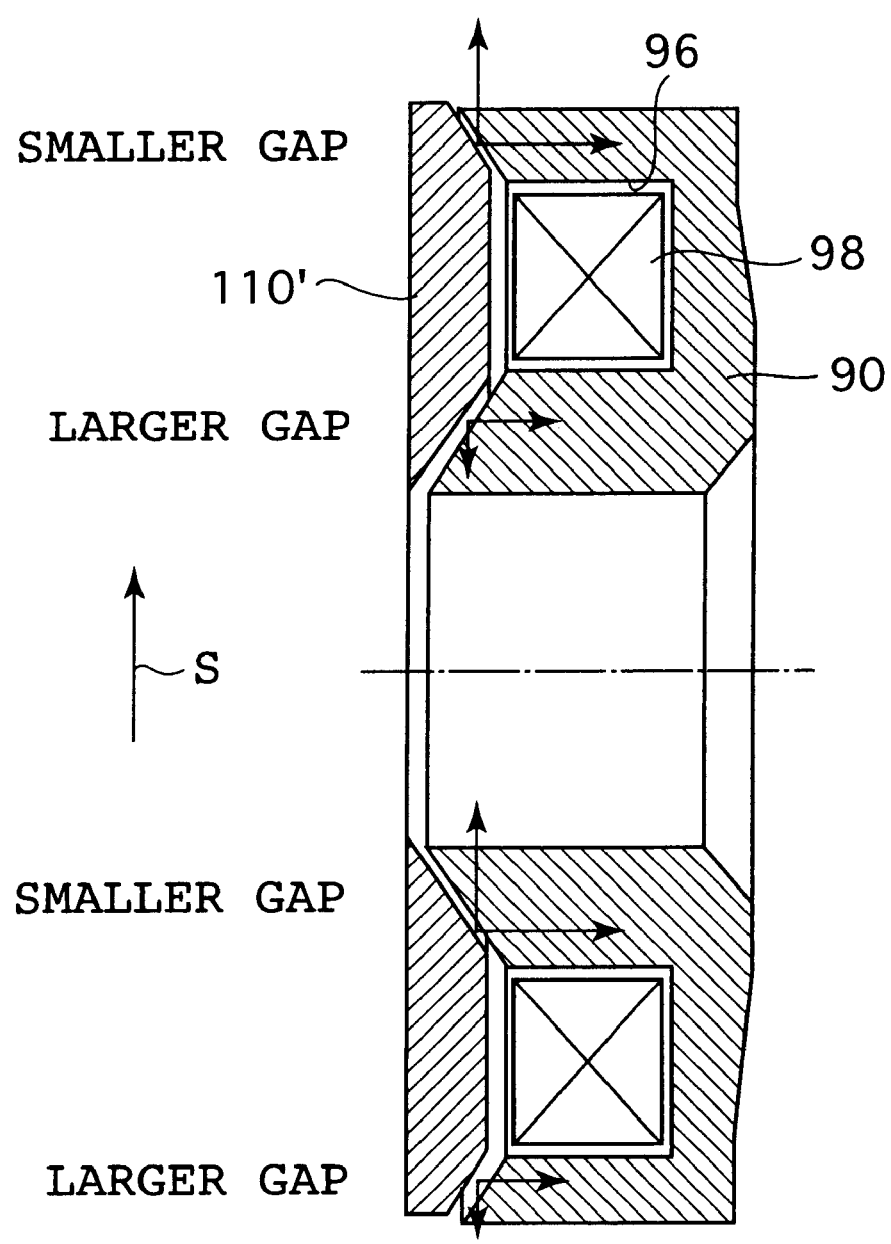
FIG. 17 is a sectional view showing the relation between the radially inside and outside air gaps in the modification shown in FIG. 16 when the axis of the armature member is deviated.

Letting L denote the engagement length between the core member 90 and the cylindrical pressure member 120 and G denote the gap between the core member 90 and the cylindrical pressure member 120, the tilt angle of the armature member 110' is given by $\tan^{-1}(G/L)$. In the case that the axis of the armature member 110' is deviated in a direction of arrow S shown in FIG. 17, the air gap between the radially inside tapered end surfaces of the core member 90 and the armature member 110' and the air gap between the radially outside tapered end surface of the core member 90 and the armature member 110' are related with each other as shown in FIG. 17, thereby allowing a reduction in moment of tilt of the armature member 110' due to imbalance of the attraction force. As a result, the tilt of the armature member 110' can be prevented to thereby allow the use in the condition where the air gap becomes small.

Referring again to FIG. 16, the tapered central hole 111 of the armature member 110' is enlarged to thereby make the air gap between the radially inside tapered end surfaces of the core member 90 and the armature member 110' larger than the air gap between the radially outside tapered end surfaces of the core member 90 and the armature member 110'. By making the inside air gap larger than the outside air gap as mentioned above, the contact of the core member 90 and the armature member 110' due to deflection of the armature member 110' can be avoided.

This effect of avoiding the contact is similar to the effect obtained by making the tapered angle of the radially inside tapered end surface different from the tapered angle of the radially outside tapered end surface as mentioned above. According to the preferred embodiment shown in FIG. 16, however, the productivity can be improved because the tapered angles of the radially inside and outside tapered end surfaces are set equal to each other. As a modification for avoiding the contact of the core member 90 and the armature member 110, the tapered angle of the radially inside tapered end surface 99 of the core member 90 may be set to 90°, that is, the tapered end surface 99 may be set at right angles to the axis of the core member 90. While the present invention is applied to an electromagnetic brake in each preferred embodiment mentioned above, the present invention may be applied similarly to an electromagnetic clutch for selectively engaging two members.

According to the present invention, the opposed portion between the core member and the armature member is formed by the tapered surfaces each having a predetermined tapered angle. Accordingly, even when the stroke of the cylindrical pressure member is changed by the aged deterioration of the multiplate brake mechanism, the air gap between the core member and the armature member decreases by an amount corresponding to the tapered angle, so that the relation between the stroke of the cylindrical pressure member and the air gap becomes a one-to-one or less correspondence. Accordingly, a change in the air gap due to the aged deterioration (wear) of the multiplate brake mechanism can be suppressed. As a result, the control of the attraction force, or the control of the braking force in the multiplate brake mechanism can be accurately performed without much influence by the aged deterioration.

Preferably, the second angle is set larger than the first angle. Accordingly, the air gap between the radially inside tapered end surfaces of the core member and the armature member can be preliminarily set larger than the air gap between the radially outside tapered end surfaces of the core member and the armature member, thereby improving the margin for contact between the core member and the armature member.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An electromagnetic coupling apparatus interposed between a fixed housing and a rotating member at least partially accommodated in said fixed housing, comprising:
   a multiplate brake mechanism having a plurality of brake plates mounted on said fixed housing and a plurality of brake discs mounted on said rotating member so as to be arranged in alternate relationship with said brake plates;

a ringlike core member fixed in said fixed housing, said core member having an annular groove and a first outer diameter;

an annular exciting coil accommodated in said annular groove of said core member;

a ringlike armature member arranged in opposed relationship with said annular groove of said core member, said armature member having a second outer diameter larger than said first outer diameter; and a cylindrical pressure member provided so as to surround the outer circumferential surface of said core member and be movable in a direction of pressing said multiplate brake mechanism as being guided by said core member, said pressure member having a first end fixed to an outer circumferential portion of said armature member and a second end engaged with said multiplate brake mechanism;

said ringlike core member having a first radially outside tapered end surface formed radially outside of said annular groove and inclined at a first angle with respect to the axis of said core member, and a first radially inside tapered end surface formed radially inside of said annular groove and inclined at a second angle with respect to the axis of said core member;

said ringlike armature member having a second radially outside tapered end surface complementary to said first radially outside tapered end surface, a second radially inside tapered end surface complementary to said first radially inside tapered end surface, and an intermediate end surface opposed to said annular exciting coil.

2. An electromagnetic coupling apparatus according to claim 1, wherein said second angle is set larger than said first angle.

3. An electromagnetic coupling apparatus according to claim 1, wherein said second radially outside tapered end surface and said second radially inside tapered end surface of said ringlike armature member form a conical projection.

4. An electromagnetic coupling apparatus interposed between a fixed housing and a rotating member at least partially accommodated in said fixed housing, comprising:

a multiplate brake mechanism having a plurality of brake plates mounted on said fixed housing and a plurality of brake discs mounted on said rotating member so as to be arranged in alternate relationship with said brake plates;

a first ringlike core member fixed in said fixed housing, said first ringlike core member having an annular groove, a first outer diameter, and a first inclined end surface inclined at a first angle with respect to the axis of said first ringlike core member;

a second ringlike core member fixed to said first ringlike core member, said second ringlike core member having a second inclined end surface inclined at a second angle with respect to the axis of said second ring-like core member;

an annular exciting coil accommodated in said annular groove of said first ringlike core member;

a ringlike armature member arranged in opposed relationship with said first and second inclined end surfaces of said first and second ringlike core members, said armature member having a second outer diameter larger than said first outer diameter; and a cylindrical pressure member provided so as to surround the outer circumferential surface of said first ringlike core member and be movable in a direction of pressing said multiplate brake mechanism as being guided by said first ringlike core member, said pressure member having a first end fixed to an outer circumferential portion of said armature member and a second end engaged with said multiplate brake mechanism;

said ringlike armature member having a radially outside end surface inclined at said first angle with respect to the axis of said armature member and a radially inside end surface inclined at said second angle with respect to the axis of said armature member.

5. A drive force distributing apparatus for a four-wheel drive vehicle having a pair of first drive wheels and a pair of second drive wheels, comprising:

a fixed housing;

a first axle connected to one of said first drive wheels;

a second axle connected to the other first drive wheel;

an input shaft rotatably mounted in said fixed housing and connected to a drive source;

a first planetary gear assembly having a first ring gear operatively connected to said input shaft, a first planetary carrier fixed to said first axle, a first sun gear rotatably mounted on said first axle, and a first planet gear carried by said first planetary carrier so as to mesh with both said first ring gear and said first sun gear;

a second planetary gear assembly having a second ring gear operatively connected to said input shaft, a second planetary carrier fixed to said second axle, a second sun gear rotatably mounted on said second axle, and a second planet gear carried by said second planetary carrier so as to mesh with both said second ring gear and said second sun gear;

a first multiplate brake mechanism interposed between said fixed housing and said first sun gear;

a first electromagnetic coupling apparatus for controllably operating said first multiplate brake mechanism;

a second multiplate brake mechanism interposed between said fixed housing and said second sun gear; and a second electromagnetic coupling apparatus for controllably operating said second multiplate brake mechanism;

a drive force from said input shaft being distributed among said first axle, said second axle, and said second drive wheels by operating said first electromagnetic coupling apparatus and said second electromagnetic coupling apparatus;

said first electromagnetic coupling apparatus comprising:
a first ringlike core member fixed in said fixed housing, said first core member having a first annular groove and a first outer diameter;
a first annular exciting coil accommodated in said first annular groove of said first core member;
a first ringlike armature member arranged in opposed relationship with said first annular groove of said first core member, said first armature member having a second outer diameter larger than said first outer diameter; and
a first cylindrical pressure member provided so as to surround the outer circumferential surface of said first core member and be movable in a direction of pressing said first multiplate brake mechanism as being guided by said first core member, said first pressure member having a first end fixed to an outer circumferential portion of said first armature member and a second end engaged with said first multiplate brake mechanism;

said first ringlike core member having a first radially outside tapered end surface formed radially outside of said first annular groove and inclined at a first angle with respect to the axis of said first core member, and a first radially inside tapered end surface formed radially inside of said first annular groove and inclined at a second angle with respect to the axis of said first core member;

said first ringlike armature member having a second radially outside tapered end surface complementary to said first radially outside tapered end surface, a second radially inside tapered end surface complementary to said first radially inside tapered end surface, and a first intermediate end surface opposed to said first annular exciting coil;

said second electromagnetic coupling apparatus comprising:
  a second ringlike core member fixed in said fixed housing, said second core member having a second annular groove and a third outer diameter;
  a second annular exciting coil accommodated in said second annular groove of said second core member;
  a second ringlike armature member arranged in opposed relationship with said second annular groove of said second core member, said second armature member having a fourth outer diameter larger than said third outer diameter; and
  a second cylindrical pressure member provided so as to surround the outer circumferential surface of said second core member and be movable in a direction of pressing said second multiplate brake mechanism as being guided by said second core member, said second pressure member having a third end fixed to an outer circumferential portion of said second armature member and a fourth end engaged with said second multiplate brake mechanism;

said second ringlike core member having a third radially outside tapered end surface formed radially outside of said second annular groove and inclined at a third angle with respect to the axis of said second core member, and a third radially inside tapered end surface formed radially inside of said second annular groove and inclined at a fourth angle with respect to the axis of said second core member;

said second ringlike armature member having a fourth radially outside tapered end surface complementary to said third radially outside tapered end surface, a fourth radially inside tapered end surface complementary to said third radially inside tapered end surface, and a second intermediate end surface opposed to said second annular exciting coil.

* * * * *